Jan. 6, 1925.
E. SPECKETER
ATTACHMENT FOR CORN SHELLERS
Filed April 9, 1924
1,521,973
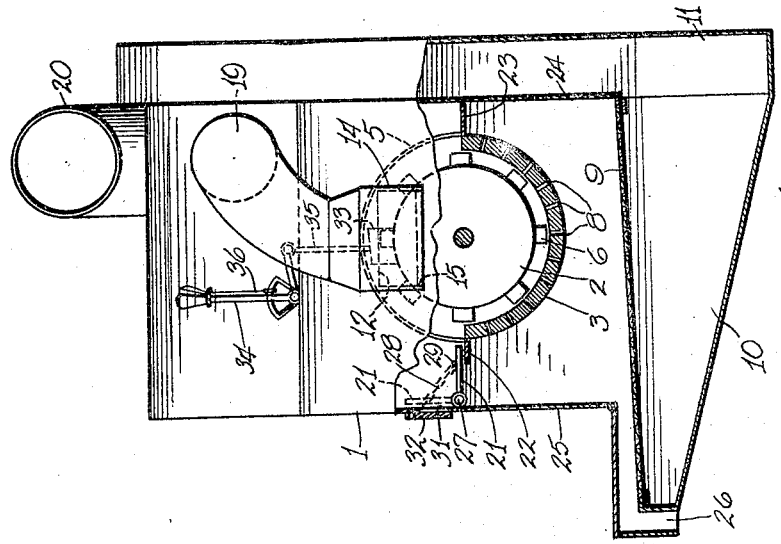
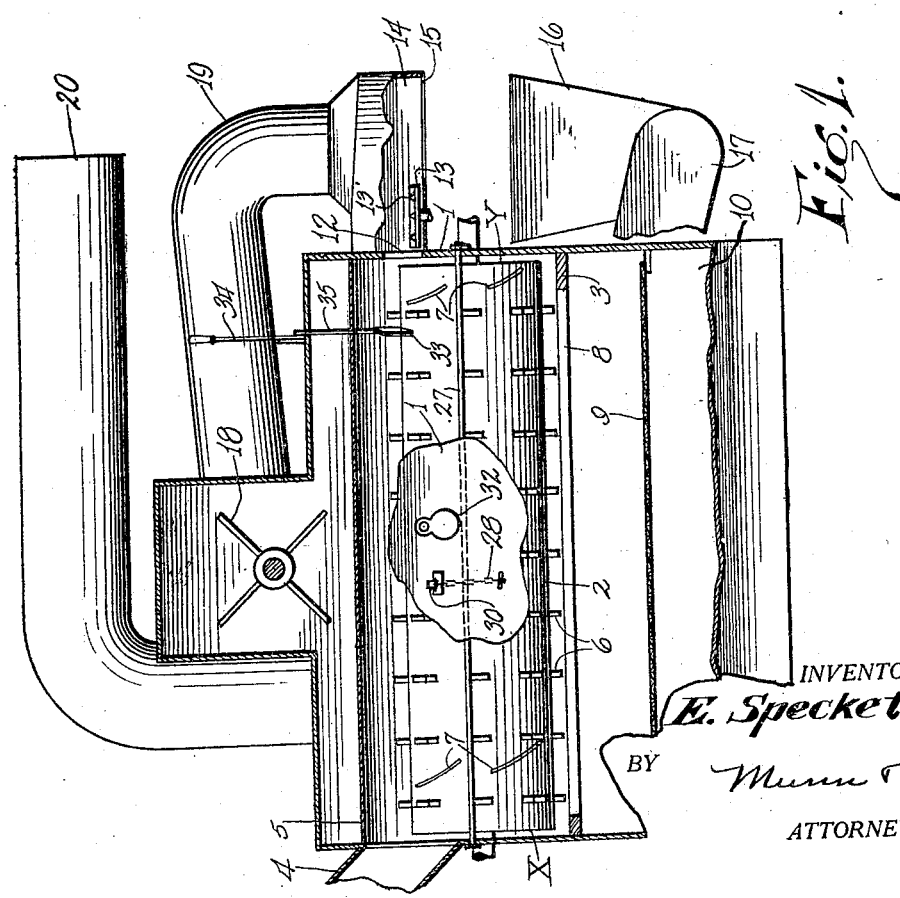
INVENTOR
E. Speckter
BY
ATTORNEYS Patented Jan. 6, 1925.

1,521,973

UNITED STATES PATENT OFFICE.

EDGAR SPECKETER, OF GALVA, IOWA.

ATTACHMENT FOR CORN SHELLERS.

Application filed April 9, 1924. Serial No. 705,282.

*To all whom it may concern:*

Be it known that I, EDGAR SPECKETER, a citizen of the United States, and a resident of Galva, in the county of Ida and State of Iowa, have invented a new and useful Improvement in Attachments for Corn Shellers, of which the following is a full, clear, and exact description.

My invention relates to improvements in attachments for corn shellers, and it consists in the combinations, constructions, and arrangements herein described and claimed. In the standard type of corn shellers the corn is fed into a cylinder in which the husks, kernels and cobs are separated from each other. The corn falls from the cylinder onto a screen and is conveyed away to bags or other like receiving means. The husks and cobs are carried to the cylinder that is disposed opposite to the corn entrance of the cylinder. The husks and cobs are then conveyed through an opening in the wall of the device. At this point the cobs drop into a hopper and are conveyed away, while the husks are drawn up through a pipe by means of a suction fan. I have found in this type of device that the suction is not sufficient in many instances to remove all of the husks from the cobs.

The principal object of the present invention is to provide an attachment for a corn sheller which is adapted to regulate the amount of air sucked through the suction pipe, whereby all of the husks may be removed from the cobs.

A further object of my invention is to provide a device which is simple in construction, and which may be readily attached to a standard corn sheller with but slight alterations being necessary in the latter.

Other objects and advantages will appear in the following specification, and the novel features of the invention will be particularly pointed out in the appended claims.

My invention is illustrated in the accompanying drawings forming part of this application, in which Figure 1 is a vertical section through a corn sheller, a portion thereof being shown in elevation.

Figure 2 is an end view of the corn sheller, a portion thereof being broken away.

In carrying out my invention I make use of a standard type corn sheller which comprises a casing 1, a cylinder 2, a grate 3 and a corn entrance chute 4. The top of the cylinder 2 is inclosed by means of a drum 5. The corn is fed into the chute 4 by the ordinary means, not shown, and is conveyed to the cylinder 2. The teeth 6 on the cylinder 2 remove the husks and kernels from the corn during the time the corn is passing from the end X of the cylinder to the end Y. The curved lugs 7 are also carried by the cylinder 2 and aid in moving the corn from the end X to the end Y. The kernels which are removed from the cobs fall through slots 8 into the grate 3 and drop upon a screen 9. The screen is reciprocated by any means not shown and causes the kernels to drop into a receiving compartment 10, which conveys them to a conveyor shown diagrammatically at 11. The conveyor conveys the corn to sacks or other like receiving device. The casing 1 is provided with an opening 12 through which the husks and cobs are expelled. A disc 13 is provided in the standard machine for removing the husks and cobs from the opening 12. The means for rotating the disc 13 and the cylinder 2 is not shown, since any means for accomplishing this purpose will answer the purpose intended. In the standard machine, the disc 13 is provided with radially extending ribs 13' in its upper surface. These ribs convey the corn husks away from the opening 12 as they are fed therethrough, and to the opening 15. The opening 12 communicates with the compartment 14 in which the disc 13 is disposed. The compartment 14 has an opening 15 through which the cobs are adapted to drop, the cobs being received in a hopper 16 from which they are conveyed away by a conveyor 17.

The corn sheller is further provided with a suction fan 18 from which the pipe 19 extends. The pipe 19 is in communication with the compartment 14 and is disposed directly above the opening 15. It will therefore be observed from this construction that when the fan 18 is started, a suction is created in the pipe 19 which is sufficient to remove the husks from the cobs. The husks are conveyed through the pipe 19 and are expelled through a pipe 20 that is in communication with the fan compartment. The construction described so far forms no part of my invention except in so far as it cooperates with the parts now to be described.

I have found that the suction created by the fan 18 is not sufficient in all cases to remove the husks from the cobs. This is due to the fact that the fan 18 draws a portion of its air from the interior of the casing 1, and does not draw all of the air through the pipe 19. In Figure 2 I have shown a draft door 21 which is adapted to close the air communication with the fan 18 through the casing 1. The grate 3 is supported by strips or supporting members 22 and 23. The strip 23 is disposed adjacent to the side 24 of the casing 1, and prevents any air from being drawn between the strip 23 and the wall 24 when the fan is operated. The supporting member 22 is spaced quite a distance from the wall 25, and it will therefore be seen that when the suction fan 18 is operating it will draw a portion of the air between the strip 22 and the wall 25. The fan 18 is shown diagrammatically in Figure 1, but in the standard machine it is constructed so as to suck air from the pipe 19 and force it through the pipe 20, the air carrying the light husks with it. If the draft door 21 is open, the fan sucks some of the air through the casing 1 which obviously cuts down the amount of air sucked through the pipe 19 and also cuts down the lifting force the suction has adjacent to the opening 15. It will be further noted that the casing 1 has an opening 26 through which chaff that is prevented from passing through the screen 9, is expelled. Air is adapted to flow through the opening 26 and then between the strip 23 and the wall 25 to the fan 18. This obviously cuts down the amount of air drawn through the pipe 19. By using the draft door 29 I can control the amount of air passing between the strip 22 and the wall 25 so as to cause a greater or less amount of air to be drawn through the pipe 19. In this way I can control the amount of suction in the pipe 19 and the amount of husks drawn up through the pipe 19. I have found that the draft door 29 when disposed in the full line position shown in Figure 2, creates a suction in the pipe 19 so great that it will not only draw the husks into the pipe 19, but will also draw some of the smaller cobs into the pipe.

From the foregoing description of the various parts of the device, the operation thereof may be readily understood. The draft door 21 is mounted upon a rod 27 which is journalled in the end wall of the casing 1. A chain 28 is connected to the door 21 at 29 and passes through an opening 30 in the casing 1. The opening is of such a shape that when the chain is twisted, one of the links will bear against the outer surface of the casing and will prevent the door from drawing the chain through the opening. A hand hole 31 is provided in the standard machine and is covered by means of a door 32. The operator in moving the door 21 inserts his hand through the opening 31 and then adjusts the door so as to cause the fan 18 to create the desired amount of suction in the pipe 19. The fan 18, the disc 13, the cylinder 2, the screen 9 and the conveyors 11 and 17 are connected to a power source (not shown) in the usual manner. The bore 21 provides a novel means for controlling the amount of suction created in the pipe 19 and permits the operator to adjust the machine so as to remove all of the husks from the cob and yet permit the cobs to drop into the hopper 16.

I have also shown novel means in Figures 1 and 2 for scraping the cylinder 2, thus preventing the cylinder from becoming clogged with the husks and cobs. A plow 33 is adapted to bear against the outer surface of the cylinder 2 and is inclined as shown in Figure 2 so as to remove the corn from the cylinder. The plow 33 is connected to a hand lever 32 by means of a link 35. The lever 34 may be swung into any position desired so as to remove the plow 33 with respect to the cylinder 2. In this way the corn may be readily cleaned off from the cylinder 2. The plow causes a more uniform movement of the husks and cobs as they are conveyed from the casing 1 whereby the suction pipe 19 tends to remove all of the husks from the cobs.

The draft door attachment is very simple in construction and instantly changes the ordinary corn sheller into a machine that is adapted to remove all of the husks from the cobs.

I claim:

1. The combination with a corn sheller having a casing, a suction pipe for removing the husks from said casing and a suction fan adapted to draw air from said casing and from said pipe, means for controlling the amount of air drawn through said casing, whereby the amount of air drawn through said pipe may be controlled at will.

2. The combination with a corn sheller having a casing, a suction pipe for removing the husks from said casing and a suction fan adapted to draw air from said casing and from said pipe, a draft door for controlling the amount of air drawn through said casing, whereby the amount of air drawn through said pipe may be controlled at will.

3. The combination with a corn sheller having a casing, a suction pipe for removing the husks from said casing and a suction fan adapted to draw air from said casing and from said pipe, a draft door for controlling the amount of air drawn through said casing, whereby the amount of air drawn through said pipe may be controlled at will, and means for securing said door in adjusted position.

4. The combination with a corn sheller having a casing, a suction pipe for removing the husks from said casing and a suction fan adapted to draw from said casing and from said pipe, a draft door for controlling the amount of air drawn through said casing, whereby the amount of air drawn through said pipe may be controlled at will and means for securing said door in adjusted position.

5. The combination with a corn sheller having a casing, a corn shelling cylinder, a casing having an opening through which husks and cobs are adapted to be moved, a suction pipe having an inlet disposed adjacent to said opening, a suction fan in communication with said pipe and the interior of said casing, means for controlling the amount of air drawn through said casing, manually controlled means for regulating the flow of cobs and husks through said opening, said air controlling means being adjustable so as to suck all of the husks from the cobs as they are expelled from the opening, and said regulating means being adjustable so as to provide a uniform flow of husks and cobs from the opening whereby all of the husks are removed from the cobs.

6. The combination with a corn sheller having a casing, a corn shelling cylinder, a casing having an opening through which husks and cobs are adapted to be moved, a suction pipe having an inlet disposed adjacent to said opening, a suction fan in communication with said pipe and the interior of said casing, a draft door for controlling the amount of air drawn through said casing, manually controlled means for regulating the flow of cobs and husks through said opening, said draft door being adjustable so as to suck all of the husks from the cobs as they are expelled from the opening, and said regulating means being adjustable so as to provide a uniform flow of husks and cobs from the opening whereby all of the husks are removed from the cobs.

7. The combination with a corn sheller having a casing, a corn shelling cylinder, a casing having an opening through which husks and cobs are adapted to be moved, a suction pipe having an inlet disposed adjacent to said opening, a suction fan in communication with said pipe and the interior of said casing, means for controlling the amount of air drawn through said casing, manually controlled means for regulating the flow of cobs and husks through said opening, said air controlling means being adjustable so as to suck all of the husks from the cobs as they are expelled from the opening, and said regulating means being adjustable so as to provide a uniform flow of husks and cobs from the opening whereby all of the husks are removed from the cobs.

EDGAR SPECKETER.